United States Patent
Raju et al.

(10) Patent No.: US 11,669,516 B2
(45) Date of Patent: Jun. 6, 2023

(54) FAULT TOLERANCE FOR TRANSACTION MIRRORING

(71) Applicant: EMC IP Holding Company LLC, Hopkinton, MA (US)

(72) Inventors: Suraj Brahma Raju, Issaquah, WA (US); Max Laier, Seattle, WA (US); Ronald Steinke, Tacoma, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 260 days.

(21) Appl. No.: 17/083,991

(22) Filed: Oct. 29, 2020

(65) Prior Publication Data
US 2022/0138177 A1    May 5, 2022

(51) Int. Cl.
*G06F 16/00* (2019.01)
*G06F 16/23* (2019.01)
*G06F 11/14* (2006.01)

(52) U.S. Cl.
CPC ...... *G06F 16/2379* (2019.01); *G06F 11/1474* (2013.01); *G06F 2201/82* (2013.01)

(58) Field of Classification Search
CPC .... G06F 3/0664; G06F 3/0647; G06F 3/0619; G06F 3/0683; G06F 3/065; G06F 3/067; G06F 3/0688; G06F 11/1469; G06F 3/0667; G06F 3/0685; G06F 3/0665; G06F 3/061; G06F 3/0689; G06F 16/182; G06F 3/064
See application file for complete search history.

(56) References Cited

U.S. PATENT DOCUMENTS

| | | | |
|---|---|---|---|
| 7,873,619 B1* | 1/2011 | Faibish | G06F 16/13 707/823 |
| 2006/0095438 A1 | 5/2006 | Fachan et al. | |
| 2015/0006846 A1* | 1/2015 | Youngworth | G06F 3/0689 711/216 |
| 2018/0322157 A1 | 11/2018 | Lee et al. | |

OTHER PUBLICATIONS

Raju, et al., "System and Method for Mirroring a File System Journal," U.S. Appl. No. 16/943,576, filed Jul. 30, 2020, 38 pages.
International Search Report and Written Opinion for International Application No. PCT/US2021/028998 dated Aug. 3, 2021, 17 pages.

* cited by examiner

*Primary Examiner* — Yicun Wu
(74) *Attorney, Agent, or Firm* — Amin, Turocy & Watson, LLP

(57) ABSTRACT

Systems and methods facilitating fault tolerance for transaction mirroring are described herein. A method as described herein can include receiving a commit command for a data transaction from an initiator node of the system, wherein the data transaction is associated with a first failure domain, and wherein the commit command is directed to a primary participant node and a secondary participant node of the system; determining whether a response to the commit command has been received at the primary participant node from the secondary participant node in response to the receiving; and, in response to determining that the response to the commit command was not received at the primary participant node, indicating that the secondary participant node is invalid in a data store associated with a second failure domain that is distinct from the first failure domain.

20 Claims, 11 Drawing Sheets

FAULT TOLERANCE FOR TRANSACTION MIRRORING

TECHNICAL FIELD

The subject application is related to data storage, and more particularly, to techniques for data protection in a data storage system.

BACKGROUND

Various measures can be employed to safeguard data written in a computing system, e.g., data written across one or more nodes in a network attached storage (NAS) system and/or other distributed computing system, from power loss, equipment failures, and/or other events. By way of example, a data storage system can utilize file system journaling to provide crash consistency by logging write operations that would result in updates to one or more data or metadata blocks of a drive associated with the system on a journal associated with that drive. Once the relevant file system updates have been made durable and persistent on the journal media, the logged writes can subsequently be transferred to the drive in the background.

Also or alternatively, mirroring can be utilized to provide further protection to updates to one or more files, key-value stores, etc. For instance, a transaction to update a (primary) participant node of a system can be structured to also include a secondary (buddy) participant node, such that transactional updates of the primary participant are mirrored to the secondary participant. In such a transaction, it is desirable to implement techniques that provide improved fault tolerance for the devices and/or nodes involved in the transaction.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a transaction management component that receives, from an initiator node of the data storage system at a primary participant node of the data storage system, a transaction commit command corresponding to a data transaction associated with a first fault domain, the transaction commit command being directed to the primary participant node and a secondary participant node of the data storage system. The executable components can further include a state monitoring component that determines whether a responsive message to the transaction commit command from the secondary participant node has been received at the primary participant node in response to receiving the transaction commit command. The executable components can additionally include a state update component that, in response to determining that the responsive message was not received by the primary participant node from the secondary participant node within a threshold amount of time, indicates the secondary participant node as invalid in a data structure stored on a second fault domain that is distinct from the first fault domain.

In another aspect, a method is described herein. The method can include receiving, by a system operatively coupled to a processor, a commit command for a data transaction from an initiator node of the system, where the data transaction is associated with a first failure domain and the commit command is directed to a primary participant node and a secondary participant node of the system. The method can also include determining, by the system, whether a response to the commit command has been received at the primary participant node from the secondary participant node in response to the receiving. The method can further include, in response to determining that the response to the commit command was not received at the primary participant node, indicating, by the system, that the secondary participant node is invalid in a data store associated with a second failure domain that is distinct from the first failure domain.

In an additional aspect, a non-transitory machine-readable medium including computer executable instructions is described herein. The instructions, when executed by a processor of a data storage system, can facilitate performance of operations including receiving a first command to commit a transaction associated with a first fault domain from an initiator node of the data storage system, the first command being directed to a primary participant node and a buddy participant node of the data storage system; determining whether a response to the first command has been received at the primary participant node from the buddy participant node in response to the receiving; and in response to determining that the response to the first command was not received at the primary participant node within a threshold amount of time, identifying the buddy participant node as inactive in a data structure associated with a second fault domain that is distinct from the first fault domain.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
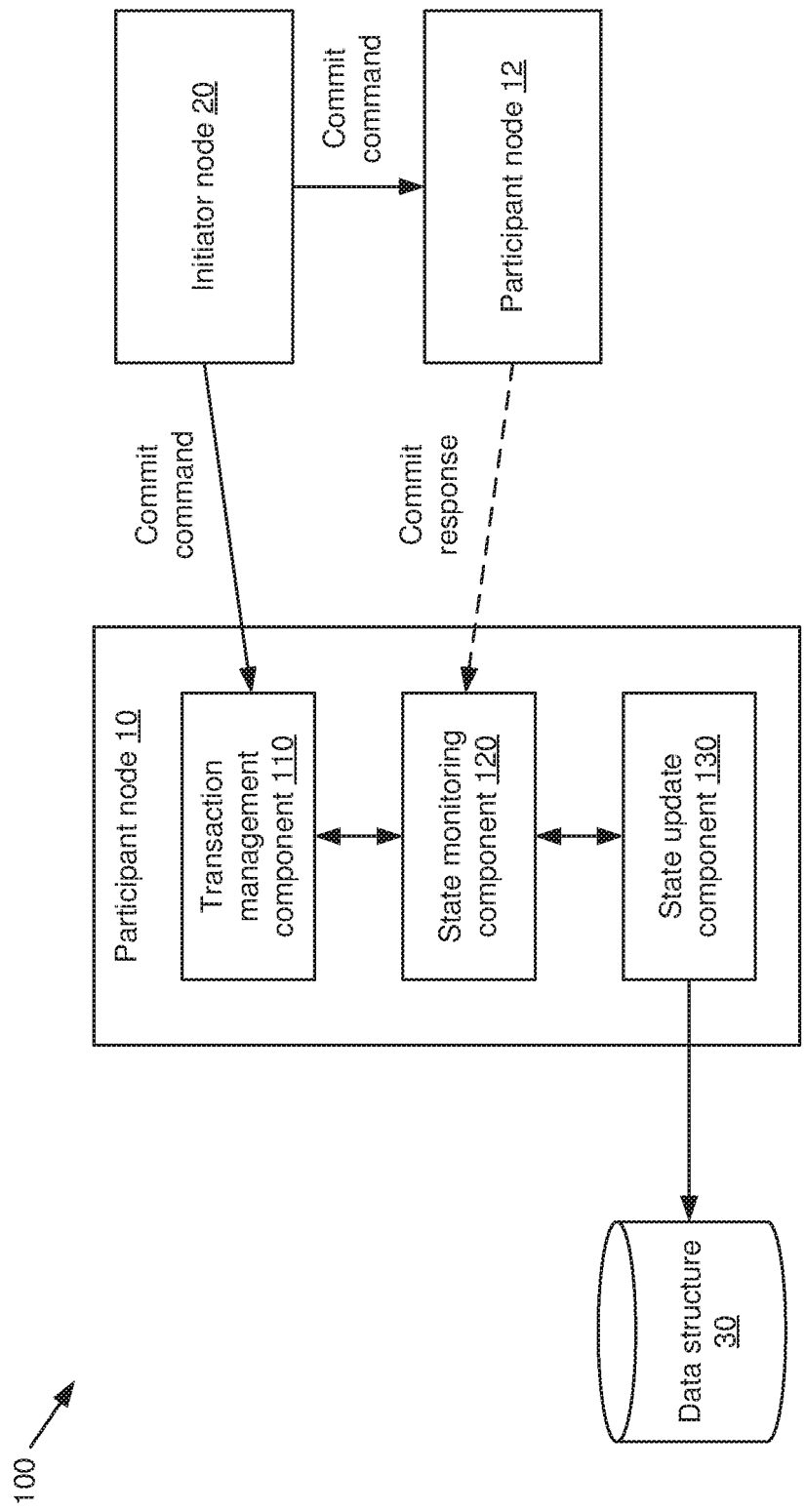
FIG. 1 is a block diagram of a system that facilitates fault tolerance for transaction mirroring in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Additionally, while some specific details of the disclosed embodiments as provided in the description below relate to file system journal mirroring, it should be appreciated that the techniques provided below can be extended to other contexts in which transactional data updates, e.g., file system updates or the like, are desirably performed. Except where explicitly stated otherwise, the various aspects given in the following description and the claimed subject matter are intended to encompass all such contexts, and are not intended to be limited to specific contexts or use cases.

In an aspect, a transaction mirroring scheme can be utilized to provide redundancy for file system updates in a data storage system. For instance, in an initiator-driven mirroring scheme, a transaction to update a primary participant node can include one or more additional participant nodes, referred to as a secondary or buddy participants, such that each transactional update of the primary participant can be mirrored to its secondary participant(s). The role of an initiator, primary participant, and secondary (buddy) participant in a data transaction are described in further detail below.

In another aspect, initiator-driven mirroring can utilize a two-phase commit (2PC) protocol, such as version 2 of the 2PC protocol (or 2PCv2), which utilizes single failure non-blocking semantics. Blocking, in this context, refers to a stoppage in the forward progress of a transaction due to inconsistencies in the transaction state among the nodes of the transaction, e.g., due to a node failure. A transaction that is blocked in this manner is also referred to as an indeterminate transaction, e.g., due to the state of the transaction being indeterminate among its associated nodes. In an aspect, by utilizing a protocol with single failure non-blocking semantics, a transaction can continue even if one of the nodes to the transaction fails.

However, transactions conducted with single failure non-blocking semantics are still subject to blocking in the event of multiple node failures. For instance, any failure of a buddy participant and an initiator for a 2PCv2 transaction can render the transaction indeterminate, such that forward progress on the transaction is blocked until the failures are recovered. This, in turn, can adversely affect the availability of the associated system cluster. To these ends, various aspects provided herein enable techniques for tolerating any number of buddy participant failures in a 2PCv2 transaction.

By implementing fault tolerance techniques for transaction mirroring as described herein, various advantages that can improve the functionality of a computing system can be realized. These advantages can include, but are not limited to, the following. Computing resources (e.g., processor cycles, memory usage, power consumption, network bandwidth utilization, etc.) associated with recovery from drive and/or node failures can be reduced. Availability and/or uptime of a cluster file system can be increased, e.g., by mitigating downtime due to node failures. Other advantages are also possible.

With reference now to the drawings, FIG. 1 illustrates a block diagram of a system 100 that facilitates fault tolerance for transaction mirroring in accordance with various aspects described herein. As shown in FIG. 1, system 100 includes a transaction management component 110, a state monitoring component 120, and a state update component 130, which can operate as described in further detail below. In an aspect, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 11.

In an aspect, the components 110, 120, 130 can be associated with a computing node and/or other computing device associated with a file storage system and/or other data storage system. For instance, the components 110, 120, 130 as shown in system 100 are each associated with a participant node 10 in system 100, which can be a primary participant for respective data transactions as noted above. Also or alternatively, the components 110, 120, 130, and/or other components as will be described in further detail below, can be implemented within other computing nodes or devices, such as an initiator node 20, a secondary (buddy) participant node such as participant node 12, and/or other suitable devices. Additionally, it should be appreciated that the components 110, 120, 130 of system 100, as well as additional other components as will be described in further detail below, can be implemented at a same computing device (node) and/or distributed among multiple computing devices (nodes).

While the participant nodes 10, 12 and the initiator node 20 shown in system 100 are logically distinct and are illustrated as distinct entities, it should be appreciated that the participant nodes 10, 12 and the initiator node 20 need not be physically distinct. For instance, the participant nodes 10, 12 and the initiator node 20 could be housed by a common physical chassis and/or other apparatus despite being logically separate system nodes. In an aspect, a participant node that is associated with a same device as an initiator node can be referred to as a shared participant. Specific techniques that can be employed in the presence of a shared participant are described in further detail below with respect to FIG. 9. Alternatively, respective ones of the nodes 10, 12, 20 could be located in different physical devices and configured to communicate with each other via any suitable wired or wireless communication protocol.

Returning to FIG. 1, the transaction management component 110 of system 100 can receive, e.g., from an initiator node 20 of system 100 as further shown in FIG. 1, a transaction commit command for a data transaction. In an aspect, the transaction commit command can be a message sent by the initiator node 20 to initiate commitment of a transaction pursuant to a transaction commit protocol such as 2PC, 2PCv2 or the like. As further shown in FIG. 1, the transaction commit command provided by the initiator node can further be directed to a second participant node 12 (e.g., a secondary or buddy participant) in addition to the (primary) participant node 10. While only two participant nodes 10, 12 are shown in FIG. 1, it should be appreciated that a data transaction as described herein can include any suitable number of participants, including any number of primary participants and/or secondary participants.

As further shown in FIG. 1, the state monitoring component 120 of system 100 can determine whether a responsive message to the transaction commit command from the secondary participant node 12 has been received at the primary participant node 10. For instance, the secondary participant node 12 can respond to a commit command received from the initiator node 20 by committing the associated transaction and then transmitting a response to the commit command to the primary participant node 10.

If the state monitoring component 120 and/or other suitable components of the primary participant node 10 determine that a responsive message has not been received from the secondary participant node 12, e.g., within a period of time defined by a configurable threshold, the state update component 130 of system 100 can mark and/or otherwise indicate the secondary participant node 12 as invalid in an associated data structure 30. In an aspect, the data structure 30 can be stored in and/or otherwise associated with a node state block (NSB), which is a per-node disk block that can be mirrored across respective drives in a given node and can be used to hold file system journal information and/or other bootstrapping information in addition to node state information. Also or alternatively, the data structure 30 can be associated with any suitable persistent data store, which can be stored in any suitable data or metadata block(s) that are mirrored across the nodes 10, 12, 20 and their respective drives.

In an aspect, the data structure 30 can be stored and/or otherwise associated with a failure (fault) domain that is distinct from the failure domain associated with the data transaction. For instance, the commit command provided by the initiator node 20 can be associated with a first failure domain, and the data structure 30 can be stored on or associated with a second, distinct failure domain. As a result, failures to one or more nodes or drives associated with a given data transaction will not affect the integrity or availability of the data structure 30.

As will be described in further detail below (e.g., with respect to FIGS. 4-6), the primary participant node 10 can be configured to respond to the commit command from the initiator node 20 only after confirming the commit of the secondary participant node 12, or by marking the secondary participant node 12 as invalid via the state update component 130. As will further be described in further detail below, a secondary participant node 12 can be configured to only respond to the initiator node 20 and its primary participant node 10. These and/or other node behaviors can facilitate participant-driven semantics for the commit phase of a transaction (e.g., a 2PCv2 transaction), resulting in improved tolerance to secondary participant failures.

Similar to the data structure 30, the secondary participant node 12 can also be associated with a distinct failure domain from the primary participant node 10, which can be the same as, or different from, the failure domain of the data structure 30. As a non-limiting example involving journal mirroring, an initiator-driven journal mirroring scheme can be utilized in which the initiator node 20 sends mirror copies of file system updates for a given participant (e.g., participant node 10) to an additional set of different participants (e.g., a set of participants including participant node 12), such that for every intended participant to the transaction, there is an additional participant on a separate journal failure domain.

As a result, in the event of a journal failure of an intended (primary) participant, a mirrored copy of the journal can be available at the additional (secondary) participant. In an aspect, the participant nodes 10, 12 can be logically separate 2PCv2 participants. As a result, the participant nodes 10, 12 can be isolated and operate in parallel with respective other participants (not shown in FIG. 1) involved in the transaction.

In a 2PCv2 transaction, if both a participant and the initiator fail after the prepare phase of the transaction, the transaction can be indeterminate. In other words, the remaining participants to the transaction can be rendered unable to make forward progress on the transaction due to having no knowledge of the status of the other, failed participant (e.g., whether the other participant is committed or aborted). As a result, secondary participant failures can induce indeterminate transactions in an initiator-driven 2PCv2 transaction.

In an aspect, system 100 can reduce the occurrence of indeterminate transactions due to secondary participant failures by utilizing a participant-driven transaction model for the commit phase of a transaction. More particularly, various aspects described herein can modify an initiator-driven transaction in one or more of the following ways to facilitate a participant-driven commit phase in order to improve fault tolerance against secondary participant failures:

1) The initiator (e.g., initiator node 20) can send prepare and commit messages to both primary participants (e.g., participant node 10) and secondary participants (e.g., participant node 12).

2) The initiator can expect and handle prepare responses from both the primary and secondary participants.

3) The initiator can be configured to expect commit responses only from primary participants.

4) A primary participant can respond to a commit only after (a) its secondary participant commits, or (b) the primary participant (e.g., via the state update component 130) marks its secondary participant as invalid in a reliable, persistent store outside of the fault domain of the primary participant, e.g., the NSB. These cases are described in further detail below with respect to FIGS. 4 and 5, respectively.

5) In the absence of the initiator, a primary participant can confirm with its secondary participant before responding to other participants. This is described in further detail below with respect to FIGS. 7-8.

Other measures can also be employed. In an aspect, use of one or more of the above measures can establish fault tolerance against secondary participant failures with minimal additional latency overhead (e.g., an additional latency cost of approximately one half round trip time (RTT)).

Figure 2:
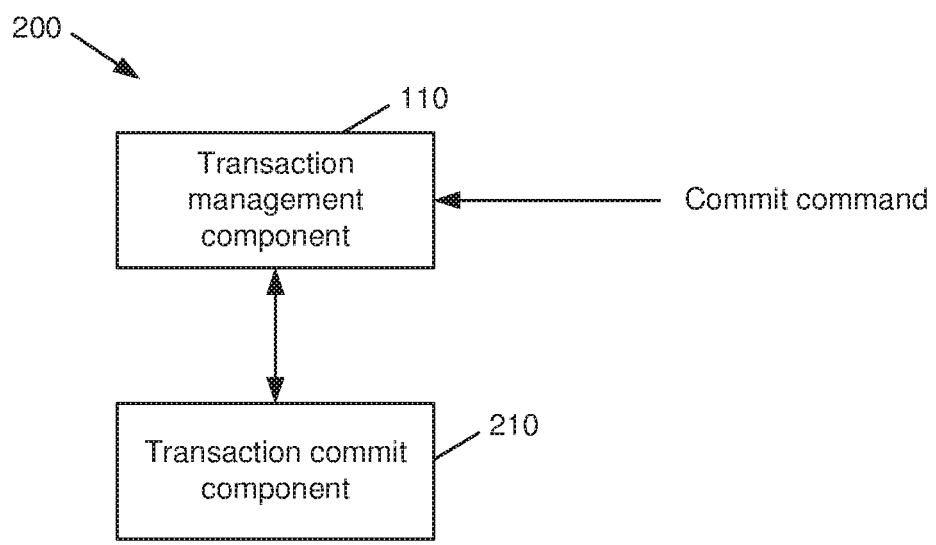
FIG. 2 is a block diagram of a system that facilitates committing a data transaction in accordance with various aspects described herein.

Turning now to FIG. 2, a block diagram of a system 200 that facilitates committing a data transaction (e.g., at a participant node 10, 12 of a data storage system) in accordance with various aspects described herein is illustrated. Repetitive description of like elements employed in other embodiments described herein is omitted for brevity. As shown in FIG. 2, system 200 includes a transaction commit component 210 that can commit a data transaction, e.g., at a primary participant node 10 or a secondary participant node 12, in response to receiving a corresponding transaction commit command.

In an aspect, a participant node 10 can utilize the transaction commit component 210 as shown in FIG. 2 to provide baseline commit functionality for a transaction, and this baseline functionality can be augmented by the components 110, 120, 130 of system 100 as described above to complete data transactions, such as 2PCv2 transactions or the like, based on the operational state of a secondary (buddy) participant node 12, e.g., as determined by the state monitoring component 120.

Figure 3:
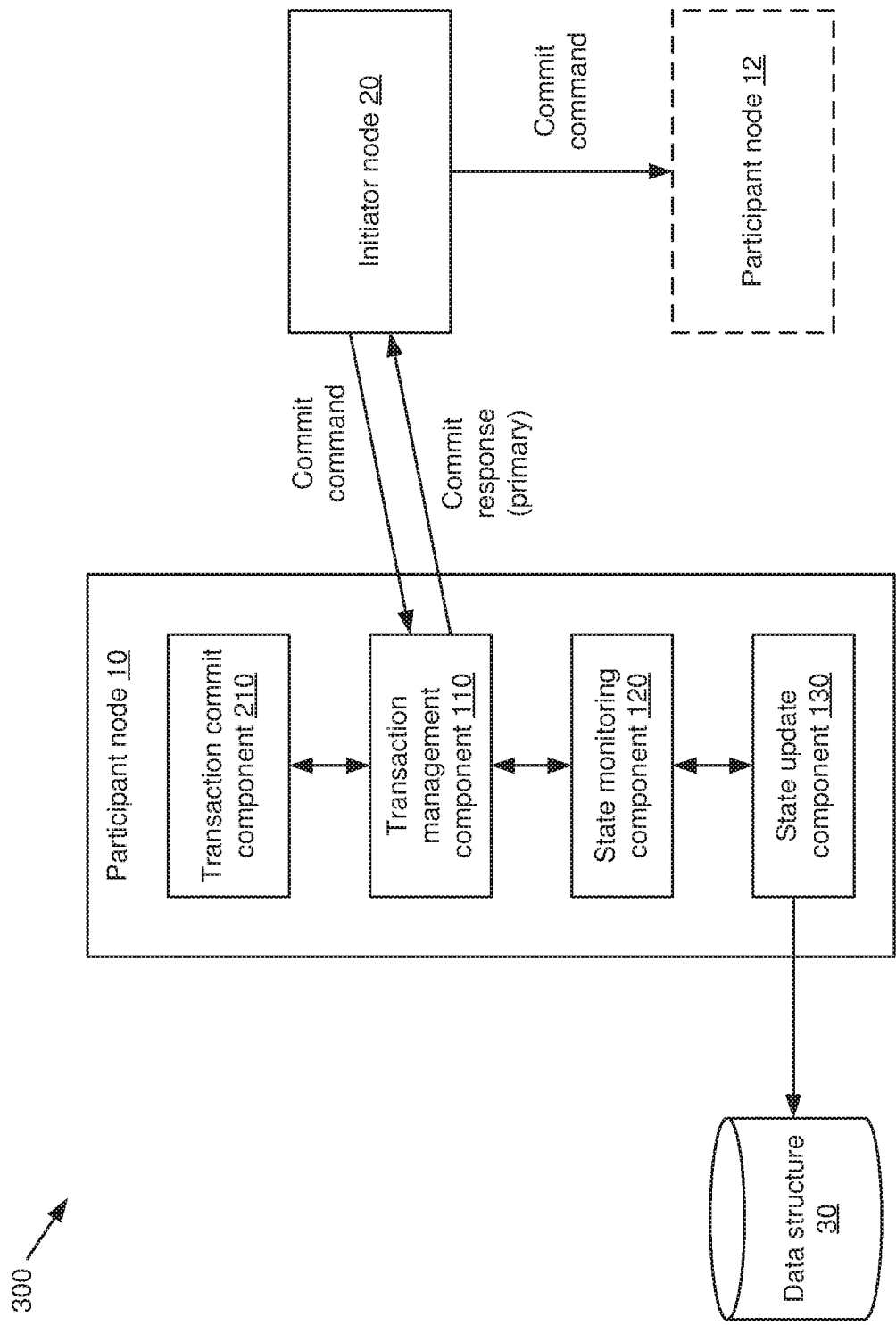
FIGS. 3-4 are block diagrams of respective systems that facilitate techniques for committing a data transaction as shown in FIG. 2 for respective operational states of a secondary participant node in accordance with various aspects described herein.

By way of a first example, system 300 in FIG. 3 illustrates respective operations that can be performed by an initiator node 20 and a primary participant node 10 to confirm a transaction where a secondary participant node 12 has failed or otherwise has not responded to a transaction commit command from the initiator node 20. In the scenario shown by system 300, in the event that a secondary participant node 12 to the transaction is disconnected or otherwise does not respond for a configurable period of time, the primary participant node 10 can mark the secondary participant node 12 as invalid, e.g., in an NSB or other data structure 30 via a state update component 130 as described above. Subsequently, the primary participant node 10 can commit the transaction via the transaction commit component 210 and respond to the initiator node 20 with its own responsive message (e.g., via the transaction management component 110).

By utilizing the above procedure, the primary participant node 10 can continue a transaction to completion, even in a case where the secondary participant node 12 has timed out and/or otherwise failed, by dropping the secondary participant node 12 from the transaction in response to marking the secondary participant node 12 as invalid in the data structure 30. In an aspect in which the transaction shown in system 300 relates to journal mirroring, since any journal restore following a journal loss can consult the data structure 30 (e.g., via an NSB), the validity information in the data structure 30 can avoid using stale information corresponding to the secondary participant node 12 in future transactions.

Figure 4:
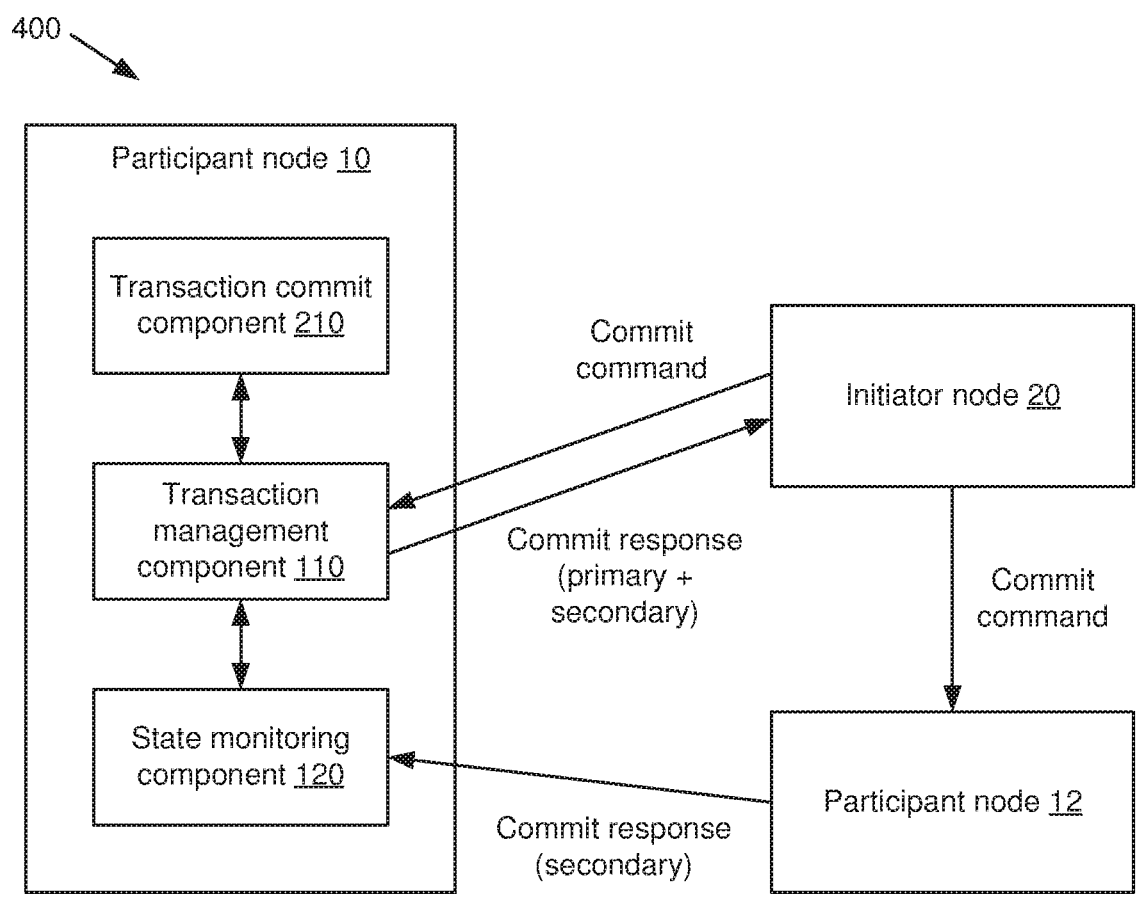

In contrast, system 400 in FIG. 4 illustrates a case in which the secondary participant node 12 remains responsive throughout the transaction. In the scenario shown by system 400, the primary participant node 10 can respond to a commit command provided by the initiator node 20 by committing the transaction at the primary participant node 10 in a similar manner to that described above with respect to FIG. 3. However, in response to the state monitoring component 120 determining that the secondary participant node 12 is active, e.g., due to a response to the commit command from the initiator node 20 being received at the primary participant node 10, the primary participant node 10 can be configured to respond to the initiator node 20 only after receiving the response from the secondary participant node 12. In the meantime, the primary participant node 10 can record, e.g., in an associated journal, that it has received a commit command from the initiator node 20 for later use. Once the primary participant node 10 receives the response from the secondary participant node 12, the primary participant node 10 can (e.g., via the transaction management component 110) generate a response to the commit command for the primary participant node 10 and send this response, along with the response received from the secondary participant node 12, back to the initiator node 20.

As shown in system 400, the primary participant node 10 can facilitate participant-driven transaction commit by acting as an intermediary between the secondary participant node 12 and the initiator node 20 during the commit phase of a transaction. For instance, while the initiator node 20 as shown in system 400 can submit a commit command directly to the secondary participant node 12, the secondary participant node 12, once committed, can be configured to respond only to the primary participant node 10 with a response to the commit command, i.e., without responding to the initiator node 20 directly. Further, during the prepare phase of a transaction, the secondary participant node 12 can be configured to receive transaction messages only from the initiator node 20 and the primary participant node 10 and to respond only to said nodes.

Figure 5:
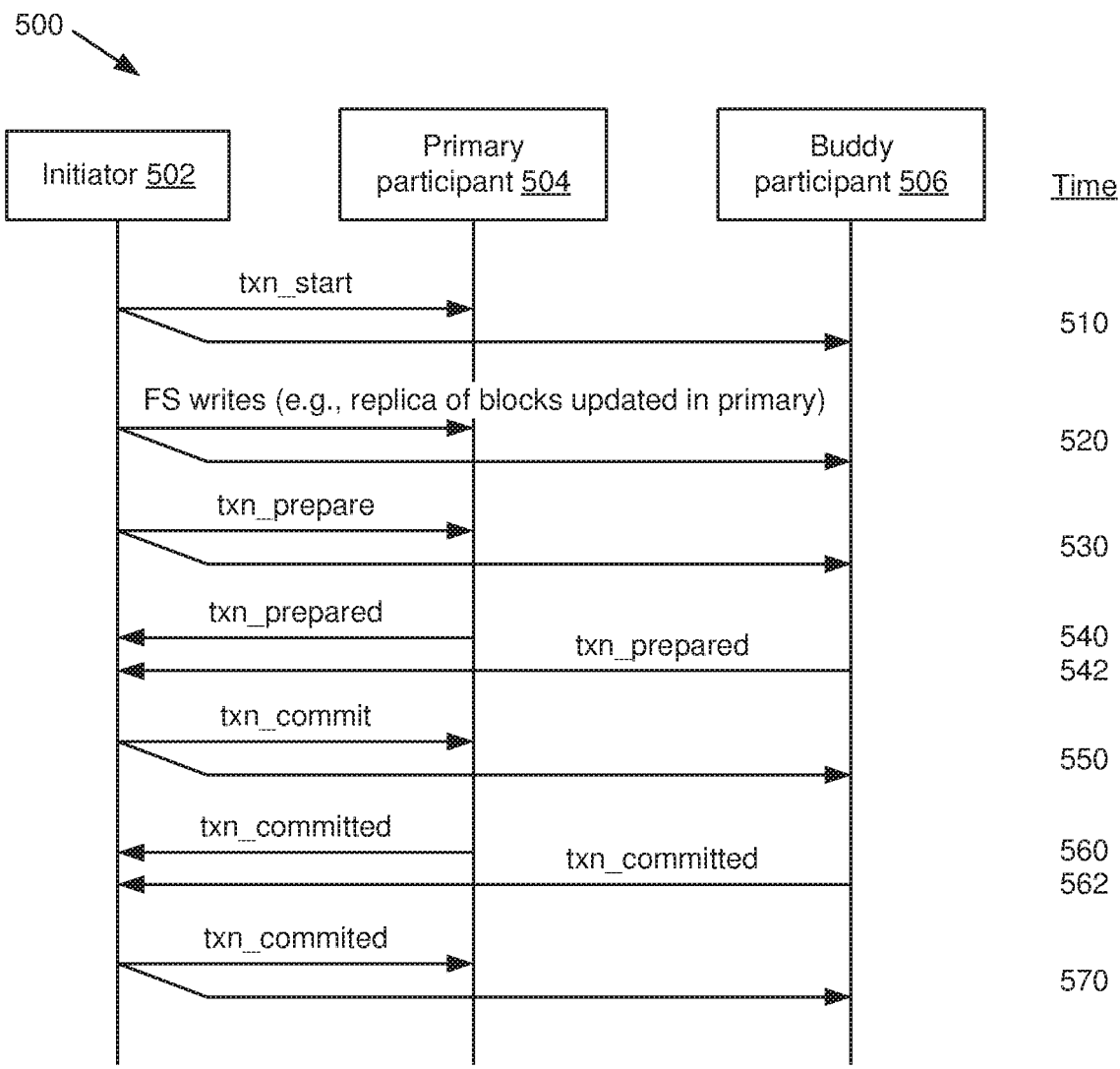
FIGS. 5-6 are diagrams depicting example messaging flows for conducting a data transaction via a two-phase commit protocol in accordance with various aspects described herein.

Turning now to FIG. 5, a diagram 500 depicting an example messaging flow for a 2PCv2 transaction, e.g., a transaction associated with a file system write and/or a similar operation, is illustrated. The messaging flow illustrated by diagram 500 can be conducted between an initiator 502 that initiates updates to one or more data or metadata blocks (e.g., one or more blocks corresponding to a file, etc.), a primary participant 504 that is associated with the respective blocks to be updated and a primary journal corresponding to the transaction, and a buddy (secondary) participant associated with a buddy (secondary) journal that corresponds to the primary journal of the primary participant 504. While only one initiator 502, primary participant 504, and buddy participant 506 are shown in diagram 500 for simplicity of illustration, it should be appreciated that similar messaging flows to those illustrated by diagram 500 could also be used for a transaction involving multiple initiators 502, primary participants 504, and/or buddy participants 506. For instance, a similar messaging flow to that shown by diagram 500 could be utilized for a transaction involving multiple primary participants 504, each of which potentially being associated with one or multiple buddy participants 506, without departing from the scope of this description.

In an aspect, one or more buddy participants 506 can be assigned to a given primary participant 504 prior to the messaging flow shown by diagram 500 via a static buddy nomination scheme and/or by other means. For instance, for each storage node in the system identified by a device identifier X, the storage node of the system having the next highest device identifier (e.g., wrapped upwards) can be nominated as a buddy for the storage node. Other schemes could also be used. In a further aspect, the initiator 502 can fetch a generation indicator and/or other information for each primary participant 504 from group management protocol (GMP) group information and/or other suitable information prior to the messaging flow shown in diagram 500.

As shown at time 510, the initiator 502 can send transaction start (txn_start) messages to the primary participant(s) 504 and the buddy participant(s) 506, respectively. In an aspect, the initiator 502 can send the txn_start messages to the primary participant(s) 504 and the buddy participant(s) 506 in parallel, e.g., as a common message directed toward both sets of participants 504, 506, and/or in separate messages. In a further aspect, the txn_start messages sent by the initiator 502 at time 510 can include verification information, such as a generation number and/or generation indicator for a primary journal, e.g., as obtained by the initiator 502 prior to time 510.

At time 520, the initiator 502 can send write and/or delta messages to the primary participant 504 that collectively include a replica of the blocks to be updated at the primary participant 504. For each write or delta message (e.g., write_block, write_delta, write_elide, write_inode, lin_super_write, etc.) sent by the initiator 502 at time 520, the initiator 502 can also send a similar message with the same payload to the buddy participant 506.

Following transfer of the write and/or delta messages at time 520, subsequent resolution of the transaction can proceed per 2PCv2 protocol. For instance, the initiator 502 can send transaction prepare (txn_prepare) messages at time 230 to the primary participant(s) 504 and buddy participant(s) 506, which can in turn respond with transaction prepared (txn_prepared) messages at times 240 and 242, respectively. In response to receiving the txn_prepared messages, the initiator 502 can then send transaction commit (txn_commit) messages at time 550 to the primary participant(s) 504 and buddy participant(s) 506, which can in turn respond with transaction committed (txn_committed) messages at times 260 and 262, respectively. The messaging flow can then conclude at time 570, during which the initiator 502 sends txn_committed messages back to the primary participant(s) 504 and buddy participant(s) 506 in order to confirm the transaction.

In an aspect, the messaging flow shown by diagram 500 has two phases, e.g., a prepare phase and a commit phase. In the prepare phase, the initiator 502 sends txn_prepare messages to the primary participant 504 and buddy participant 506, e.g., at time 530. The primary participant 504 and buddy participant 506 then respond with txn_prepared messages at times 540 and 542, respectively. Any failures of the initiator 502, primary participant 504, or buddy participant 506 at this phase can result in the transaction being aborted.

In the commit phase, if the initiator 502 receives txn_prepared messages from each primary participant 504 and buddy participant 506 to the transaction, it sends txn_commit messages to the primary participant 504 and buddy participant 506, e.g., at time 550. The primary participant 504 and buddy participant 506 then respond to the initiator 502 with txn_committed messages at times 560 and 562, respectively. Here, the initiator 502 can then wait for the first txn_committed response from either the primary participant 504 or buddy participant 506 before making the resolution of the transaction available to its callers. In an aspect, the procedure described above for the commit phase of a transaction can be modified in the case of a transaction utilizing shared and non-shared participants, as will be further discussed below with respect to FIG. 9.

Figure 6:
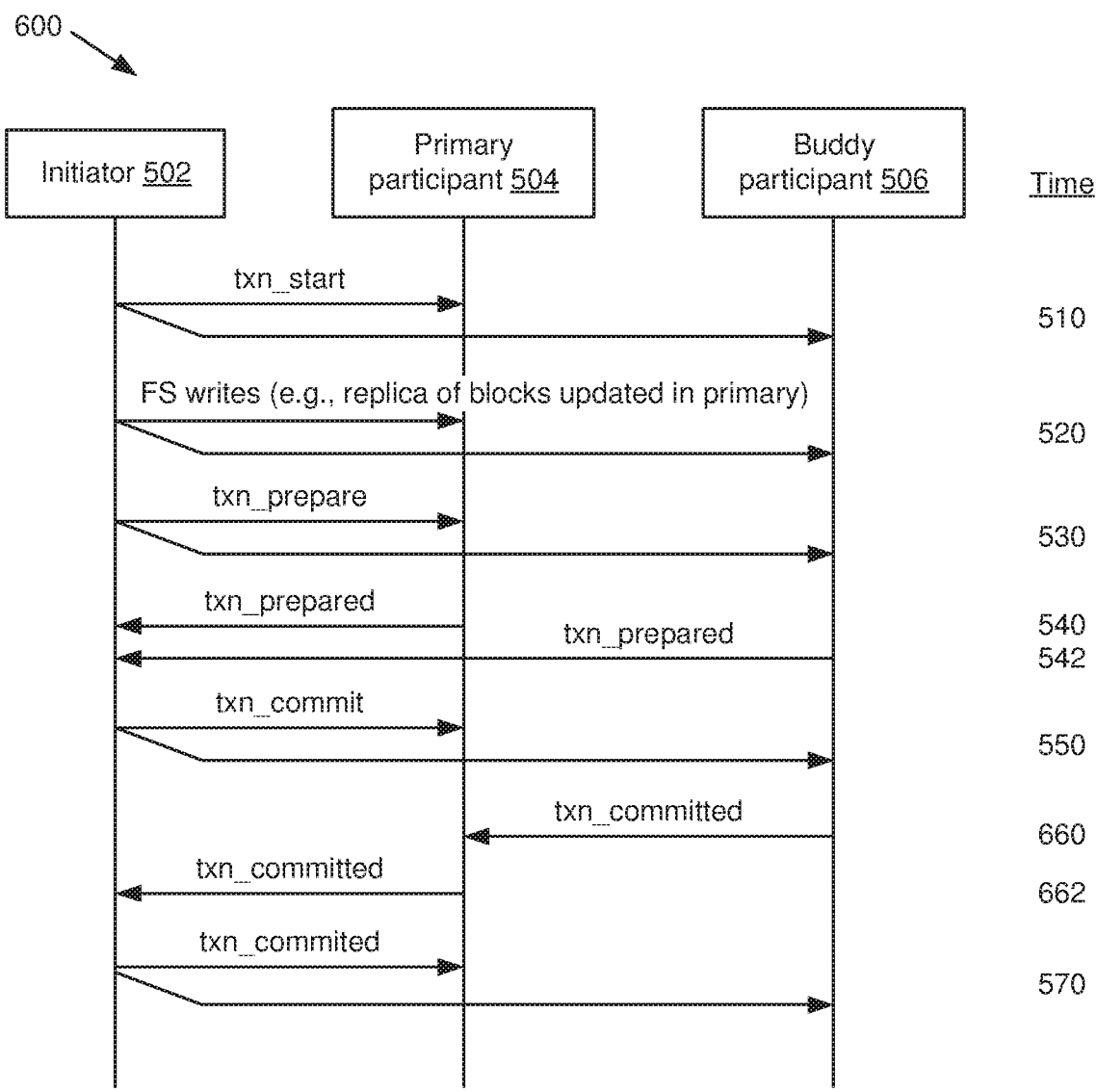

Another example messaging flow that can be conducted between an initiator 502, primary participant 504, and buddy participant 506 to facilitate improved fault tolerance is shown by diagram 600 in FIG. 6. In an aspect, the messaging flow shown by diagram 600 can operate in a similar manner to the messaging flow shown by diagram 500 for the prepare phase of the transaction, e.g., from time 510 to time 542, via initiator-driven transaction mirroring.

In contrast to the messaging flow shown by diagram 500, the messaging flow shown by diagram 600 can transition to a participant-driven transaction model for the commit phase of the transaction. Thus, in response to the txn_commit messages sent by the initiator 502 to the primary participant 504 and secondary participant 506 at time 550, the primary participant 504 can wait until the buddy participant 506 commits the transaction before proceeding. Thus, the messaging flow shown in diagram 600 proceeds to time 660 from time 550, in which the buddy participant 506 sends a txn_committed message to the primary participant 504, e.g., instead of the initiator 502. In response to receiving this message, the primary participant 504 can then send a txn_committed message to the initiator 502 at time 662 that indicates that the transaction has been committed at both the primary participant 504 and buddy participant 506. The initiator 502 can respond to the txn_committed message provided at 662 by sending a txn_committed message to the primary participant 504 and buddy participant 506, e.g., at time 570 as described above.

In an aspect, the use of a participant-driven model for the commit phase of a transaction as shown by diagram 600 can establish tolerance by the transaction to a failure of the buddy participant 506, since the buddy participant 506 responds only to the primary participant 504 in the commit phase. Thus, regardless of the operational status of the buddy participant 506 at time 662, the primary participant 504 can confirm commitment of the transaction to the initiator 502, thereby enabling the transaction to successfully complete.

Figure 7:
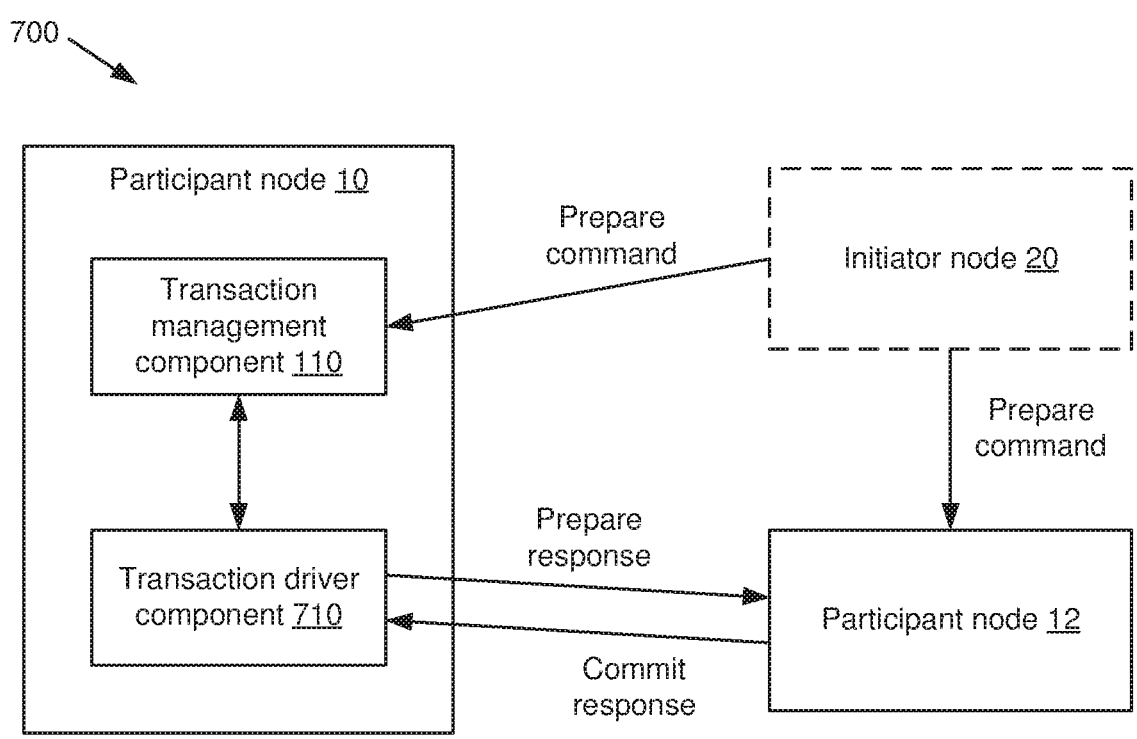
FIGS. 7-8 are block diagrams of respective systems that facilitate conducting a participant-driven data transaction in response to unavailability of an initiator node in accordance with various aspects described herein.

Turning next to FIG. 7, a block diagram of a system that facilitates conducting a participant-driven data transaction in response to unavailability of an initiator node 20 in accordance with various aspects described herein is illustrated. Repetitive description of like elements employed in other embodiments described herein is omitted for brevity. As shown in FIG. 7 and as described above, an initiator node 20 for a transaction can submit a transaction prepare command to a primary participant node 10 and/or a secondary participant node 12, e.g., as part of the prepare phase of the transaction. As further shown in FIG. 7, the primary participant node 10 of system 700 includes a transaction driver component 710 that, in response to determining that the initiator node 20 has disconnected and/or is otherwise unavailable, can transmit a response to the prepare command to an associated secondary participant node 12, e.g., in place of the initiator node 20.

As noted above, a transaction can be conducted by a primary participant node 10 via an initiator-driven prepare phase and a participant-driven commit phase. In the event that a prepared primary participant node 10 is disconnected from the initiator node 20 prior to conclusion of the prepare phase, the primary participant node 10, e.g., via the transaction driver component 710, can respond to prepared messages (e.g., txn_prepared messages as shown in FIGS. 5-6) from other primary participants to the transaction (not shown in FIG. 7) only after confirming the transaction state with its secondary participant node 12.

After disconnecting from the initiator node 20, the primary participant node 10 can first send a txn_prepared message to its secondary participant node 12. If the secondary participant node 12 has prepared the transaction, it can record the txn_prepared message from the primary participant node 10 and respond back to the primary participant node 10 in response to receiving a txn_commit or txn_abort message from the initiator node 20. Thus, if the secondary participant node 12 is still connected to the initiator node 20, it can be configured to not respond until the transaction is aborted or committed by the initiator node 20.

If, instead, the secondary participant node 12 is also disconnected from the initiator node 20, the secondary participant node 12 can be configured to respond only to its primary participant node 10. For instance, in response to determining that the initiator node 20 has disconnected, the secondary participant node 12 can send a txn_prepared message to its primary participant node 10. Subsequently, the secondary participant node 12 can be configured to receive txn_aborted and/or txn_committed messages from other primary participants and, upon receipt, record said messages and forward them to the primary participant node 10. In doing so, the secondary participant node 12 can be prevented from committing a transaction while the primary participant node 10 and any other primary participants can abort the transaction.

Figure 8:
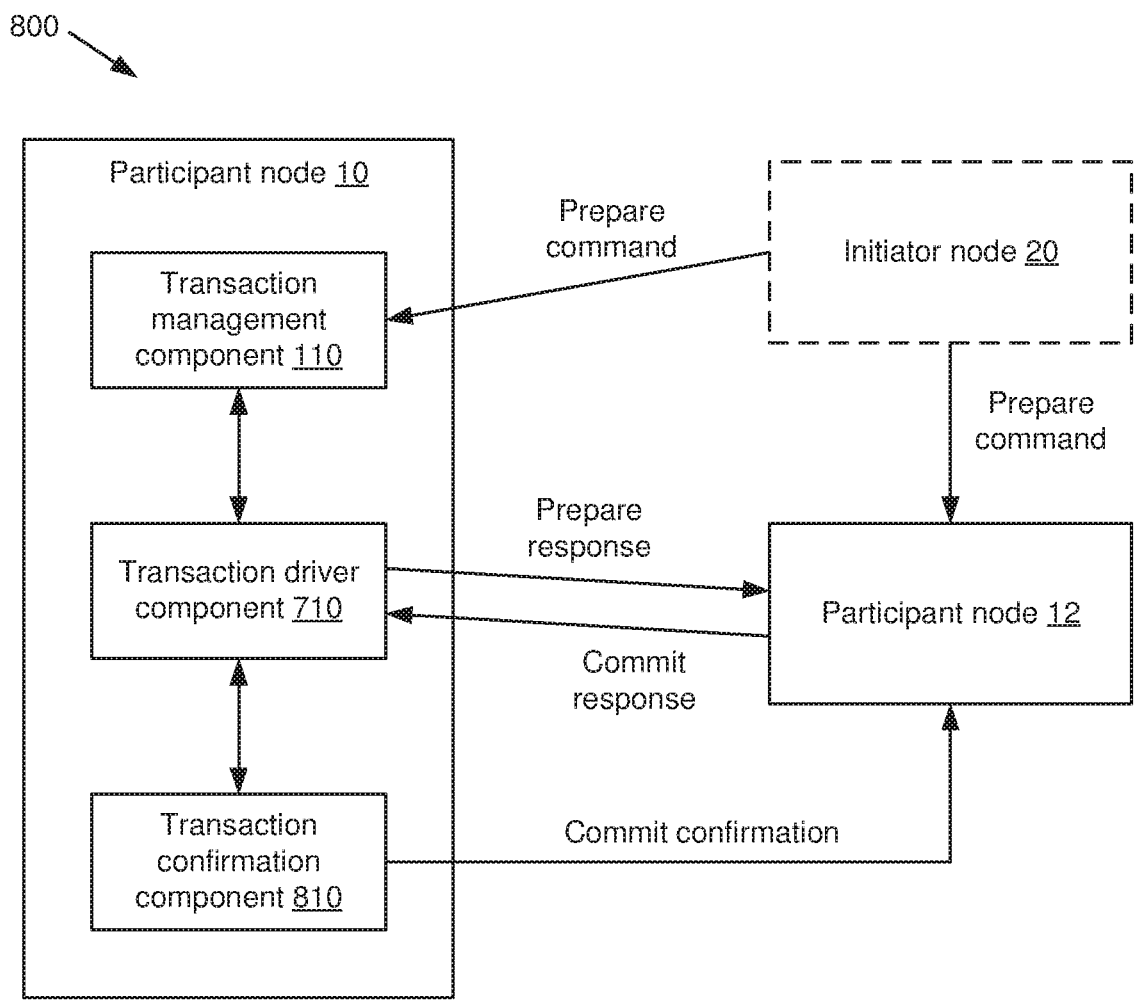

As further shown by system 800 in FIG. 8, the transaction driver component 710 of the primary participant node can commit the transaction for which the prepare command was previously received from the initiator node, e.g., in a similar manner to the transaction commit component 210 as described above. This can be done, for example, in response to receiving a responsive message from the secondary participant node 12 that indicates that the transaction has been committed at the secondary participant node 12. The primary participant node 10 of system 800 further includes a transaction confirmation component 810, which can transmit a commit confirmation message to the secondary participant node 12 and/or one or more other nodes in response to the transaction being committed at the primary participant node 10. Stated another way, in addition to the operations described above for participant-driven transaction commit, the transaction confirmation component 810 can broadcast txn_committed messages to respective other participants in the transaction, including the secondary participant node 12 as well as any other primary or secondary participants to the transaction (not shown in FIG. 8).

In an aspect, in the event that the secondary participant node 12 as shown by FIGS. 7-8 is disconnected from the initiator node 20 during a transaction, the secondary participant node 12 can be configured to respond only to its assigned primary participant node 10. Thus, for example, the secondary participant node 12 in this example can be configured to not respond to other primary or secondary participants.

Figure 9:
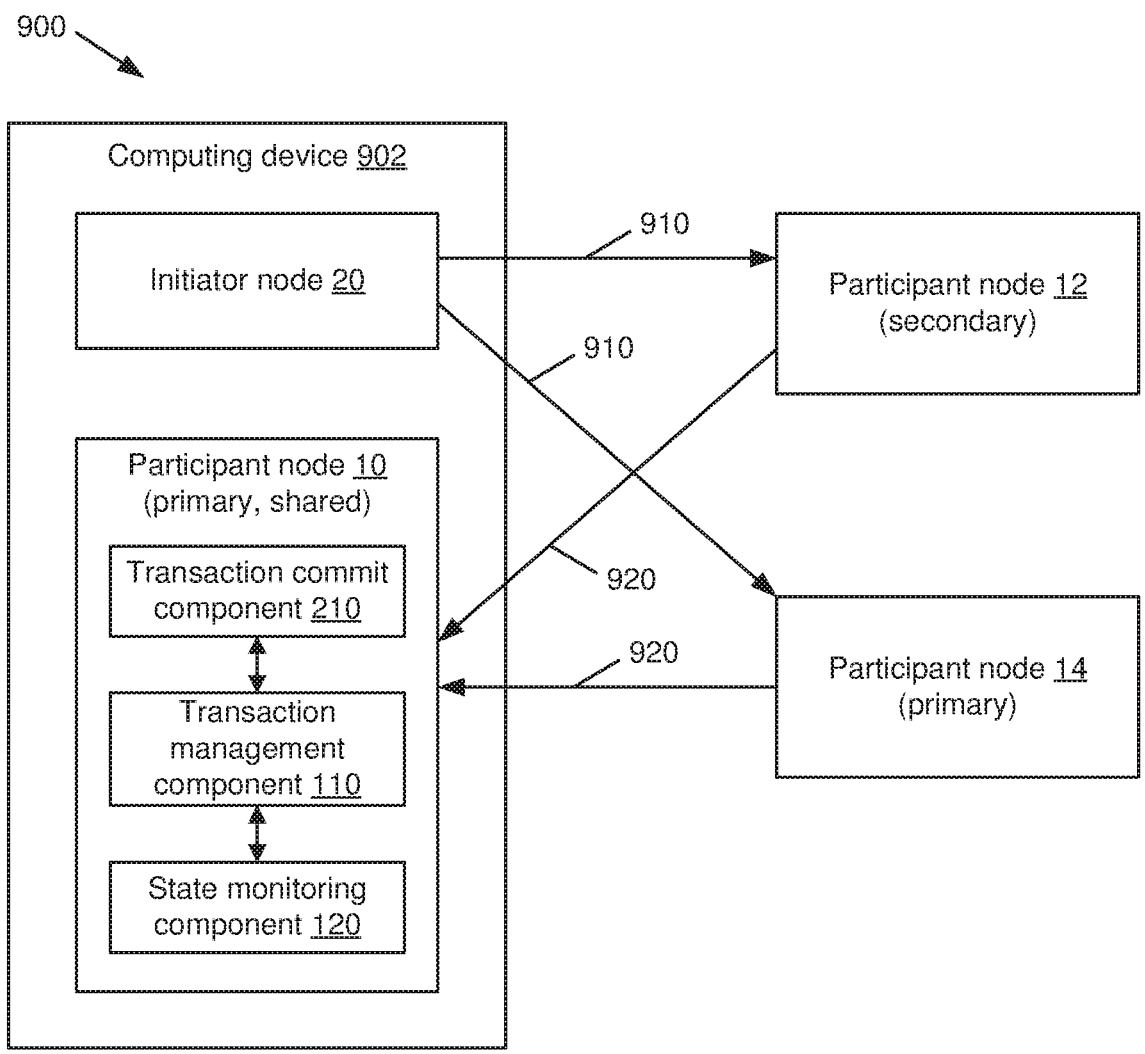
FIG. 9 is a block diagram of a system that facilitates fault tolerance for transaction mirroring via shared and non-shared participant nodes in accordance with various aspects described herein.

With reference now to FIG. 9, a block diagram of a system 900 that facilitates fault tolerance for transaction mirroring via shared and non-shared participant nodes in accordance with various aspects described herein is illustrated. Repetitive description of like elements employed in other embodiments described herein is omitted for brevity. As shown in FIG. 9, system 900 includes a computing device 902, which is a physical machine, or cluster or arrangement of physical machines, on which both the initiator node 20 and the primary participant node 10 are located. Due to the implementation of the primary participant node 10 on the same computing device 902 as the initiator node 20 (e.g., as a separate logical entity, etc.), primary participant node 10 in system 900 is referred to as a shared participant.

In an aspect, a shared participant can operate differently to a non-shared (or "normal") participant as described above in order to retain single failure non-blocking semantics. For example, a shared participant in 2PCv2 differs from normal participants in that the initiator node 20 does not send a shared participant a commit message. In further contrast to a normal participant, a shared participant can be a non-journaled pseudo-participant in a transaction.

In the example shown in FIG. 9, an initiator node 20 can send commit commands 910, e.g., txn_commit messages as described above, to respective normal participants to the transaction, here a secondary participant node 12 and a normal primary participant node 14. In response, the shared primary participant node 10 can be configured to wait for responsive messages 920 to the commit commands 910, e.g., txn_committed messages as described above, before committing the transaction. In an aspect, a shared primary participant node 10 can handle a disconnect and/or unresponsiveness of an associated secondary participant node 12 by marking it as invalid, e.g., in an NSB or other data structure 30 as described above with respect to FIG. 1.

In addition to the case of a shared primary participant as shown in FIG. 9, similar modifications can be made in the case of a shared secondary participant. For instance, similar to the shared primary participant node 10 in FIG. 9, a shared secondary participant does not receive a commit command, such as a txn_commit message, from the initiator node 20. Additionally, a shared secondary participant can be configured to commit a transaction only after receiving a txn_committed message and/or another suitable commit response from any other normal primary participants to the transaction.

Figure 10:
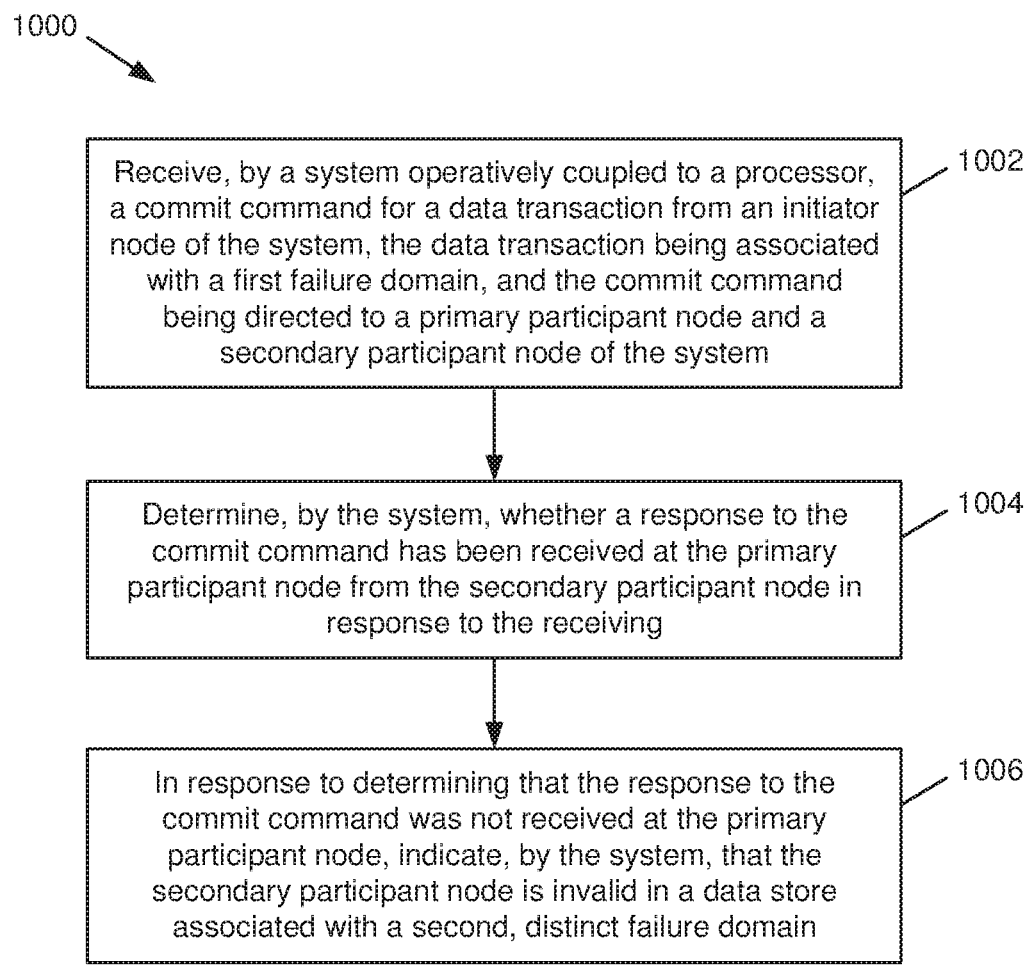
FIG. 10 is a flow diagram of a method that facilitates fault tolerance for transaction mirroring in accordance with various aspects described herein.

Referring next to FIG. 10, a flow diagram of a method 1000 that facilitates fault tolerance for transaction mirroring in accordance with various aspects described herein is illustrated. At 1002, a system operatively coupled to a processor can receive and/or otherwise obtain (e.g., by a transaction management component 110) a commit command for a data transaction (e.g., a txn_commit message) from an initiator node of the system (e.g., an initiator node 20). Here, the data transaction can be associated with a first failure domain, and the commit command can be directed to a primary participant node (e.g., a primary participant node 10) and a secondary (buddy) participant node (e.g., a secondary participant node 12) of the system.

At 1004, the system can determine (e.g., by a state monitoring component 120) whether a response (e.g., a txn_committed message) to the commit command received at 1002 has been received at the primary participant node from the secondary participant node.

At 1006, in response to determining that the response was not received by the primary participant node at 1004, the system can indicate (e.g., by a state update component 130) that the secondary participant node is invalid in a data store (e.g., an NSB or other data structure 30) associated with a second failure domain that is distinct from the failure domain associated with the transaction at 1002.

FIG. 10 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 11:
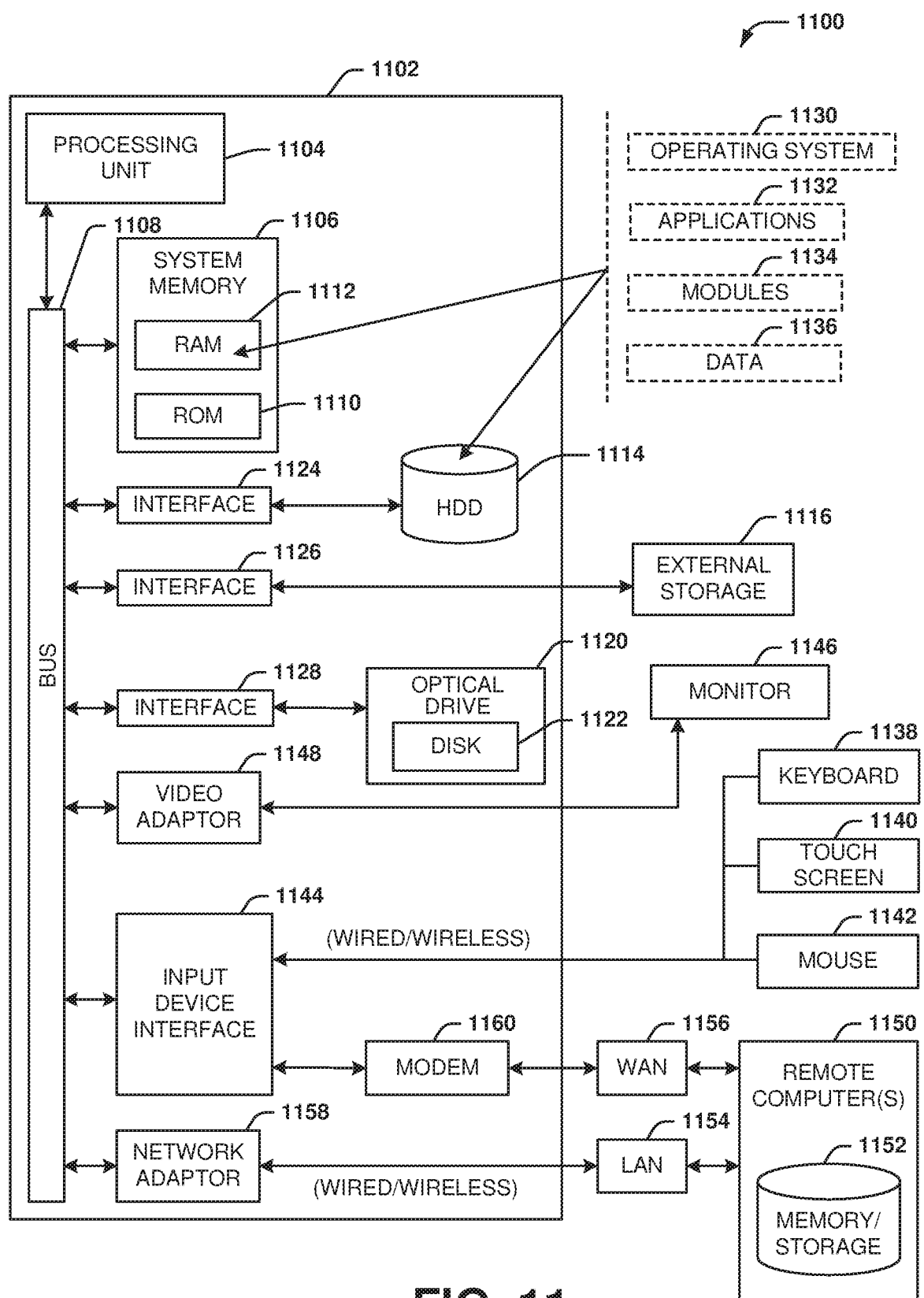
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a memory that stores executable components; and
   a processor that executes the executable components stored in the memory, wherein the executable components comprise:
   a transaction management component that receives, from an initiator node of the data storage system at a primary participant node of the data storage system, a transaction commit command corresponding to a data transaction associated with a first fault domain, the transaction commit command being directed by the initiator node to the primary participant node and a secondary participant node of the data storage system;
   a state monitoring component that determines whether a responsive message to the transaction commit command from the secondary participant node has been received at the primary participant node in response to receiving the transaction commit command, wherein the secondary participant node transmits the responsive message only to the primary participant node; and
   a state update component that, in response to the state monitoring component determining that the responsive message was not received by the primary participant node from the secondary participant node within a threshold amount of time, indicates the secondary participant node as invalid in a data structure stored on a second fault domain that is distinct from the first fault domain.

2. The data storage system of claim 1, wherein the executable components further comprise:
   a transaction commit component that commits the data transaction at the primary participant node in response to receiving the transaction commit command at the primary participant node.

3. The data storage system of claim 2, wherein the responsive message is a first responsive message, wherein the transaction commit component generates a second responsive message to the transaction commit command in response to committing the data transaction at the primary participant node, and wherein the transaction management component transmits the second responsive message to the initiator node.

4. The data storage system of claim 3, wherein the transaction commit component commits the data transaction and transmits the second responsive message to the initiator node in response to the state update component indicating the secondary participant node as invalid in the data structure.

5. The data storage system of claim 3, wherein the transaction commit component, in response to the first responsive message being received from the secondary participant node, transmits the first responsive message and the second responsive message to the initiator node.

6. The data storage system of claim 2, wherein the primary participant node is a first primary participant node located at a same device as the initiator node, wherein the responsive message is a first responsive message, wherein the transaction commit command is further directed to a second primary participant node that is distinct from the first primary participant node, and wherein the transaction commit component commits the data transaction at the first primary participant node further in response to receiving a second responsive message to the transaction commit command from the second primary participant node.

7. The data storage system of claim 1, wherein the transaction commit command is a first transaction commit command, wherein the data transaction is a first data transaction, wherein the transaction management component further receives a transaction prepare command from the initiator node for a second data transaction, and wherein the executable components further comprise:
   a transaction driver component that transmits a transaction prepare response message to the secondary participant node for the second data transaction in response to determining that the initiator node has become unavailable.

8. The data storage system of claim 7, wherein the responsive message is a first responsive message, and wherein the transaction driver component commits the second data transaction at the primary participant node in response to receiving a second responsive message from the secondary participant node for the second data transaction.

9. The system of claim 1, wherein the transaction management component drops the secondary participant node from the transaction in response to the state monitoring component determining that the responsive message was not received by the primary participant node from the secondary participant node within the threshold amount of time.

10. A method, comprising:
receiving, by a system operatively coupled to a processor, a commit command for a data transaction from an initiator node of the system, wherein the data transaction is associated with a first failure domain, and wherein the commit command is directed by the initiator node to a primary participant node and a secondary participant node of the system;
determining, by the system, whether a response to the commit command has been received at the primary participant node from the secondary participant node in response to the receiving, wherein the secondary participant node is configured to transmit the response to the commit command only to the primary participant node; and
in response to determining that the response to the commit command was not received at the primary participant node, indicating, by the system, that the secondary participant node is invalid in a data store associated with a second failure domain that is distinct from the first failure domain.

11. The method of claim 10, further comprising:
committing, by the system, the data transaction at the primary participant node in response to receiving the commit command at the primary participant node.

12. The method of claim 11, wherein the response is a first response, and wherein the method further comprises:
generating, by the system, a second response to the commit command in response to committing the data transaction at the primary participant node; and
transmitting, by the system, the second response to the initiator node.

13. The method of claim 12, wherein committing the data transaction at the primary participant node comprises transmitting the second response to the initiator node in response to indicating that the secondary participant node is invalid in the data store.

14. The method of claim 12, wherein committing the data transaction at the primary participant node comprises, in response to receiving the first response from the secondary participant node,
transmitting the first response and the second response to the initiator node.

15. The method of claim 10, wherein the response is a first response, wherein the commit command is a first commit command, wherein the data transaction is a first data transaction, and wherein the method further comprises:
receiving, by the system, a prepare command from the initiator node for a second data transaction;
transmitting, by the system, a prepare response message to the secondary participant node for the second data transaction in response to determining that the initiator node has become unavailable; and
committing, by the system, the second data transaction at the primary participant node in response to receiving a second response from the secondary participant node for the second data transaction.

16. A non-transitory machine-readable medium comprising computer executable instructions that, when executed by a processor of a data storage system, facilitate performance of operations, the operations comprising:
receiving a first command to commit a transaction associated with a first fault domain from an initiator node of the data storage system, the first command being directed by the initiator node to a primary participant node and a buddy participant node of the data storage system;
determining whether a response to the first command has been received at the primary participant node from the buddy participant node in response to the receiving, wherein the buddy participant node transmits the response to the first command only to the primary participant node; and
in response to determining that the response to the first command was not received at the primary participant node within a threshold amount of time, identifying the buddy participant node as inactive in a data structure associated with a second fault domain that is distinct from the first fault domain.

17. The non-transitory machine-readable medium of claim 16, wherein the operations further comprise:
committing the transaction at the primary participant node in response to receiving the first command at the primary participant node.

18. The non-transitory machine-readable medium of claim 17, wherein the response is a first response, and wherein the operations further comprise:
generating a second response to the first command in response to committing the transaction at the primary participant node; and
transmitting the second response from the primary participant node to the initiator node.

19. The non-transitory machine-readable medium of claim 18, wherein the operations further comprise,
in response to identifying the buddy participant node as inactive in the data structure, transmitting the second response from the primary participant node to the initiator node.

20. The non-transitory machine-readable medium of claim 18, wherein the operations further comprise,
in response to receiving the first response from the buddy participant node transmitting the first response and the second response from the primary participant node to the initiator node.

* * * * *